US006541562B1

(12) United States Patent
Aoki et al.

(10) Patent No.: US 6,541,562 B1
(45) Date of Patent: Apr. 1, 2003

(54) AQUEOUS PAINT COMPOSITION

(75) Inventors: Ryuichi Aoki, Tochigi (JP); Tadashi Hatakeyama, Tochigi (JP); Hiroharu Sasaki, Tochigi (JP); Kazuyoshi Tsuneta, Tochigi (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 211 days.

(21) Appl. No.: 09/677,882

(22) Filed: Oct. 3, 2000

(30) Foreign Application Priority Data

Jan. 28, 2000 (JP) ........................................ 2000-019868

(51) Int. Cl.[7] .............................................. C08L 83/00
(52) U.S. Cl. ........................ 524/588; 523/402; 523/406; 523/414; 523/421; 524/114; 524/188; 524/262; 524/535; 524/547
(58) Field of Search ................................. 524/188, 262, 524/114, 547, 588, 535; 523/402, 406, 414, 421

(56) References Cited

FOREIGN PATENT DOCUMENTS

| EP | 0 687 715 | 12/1995 |
|---|---|---|
| JP | 4-318014 | 11/1992 |
| JP | 6-172496 | 6/1994 |
| JP | 10-324811 | 12/1998 |

OTHER PUBLICATIONS

Patent Abstract of Japan, JP 7–258503, Oct. 9, 1995.

*Primary Examiner*—Judy M. Reddick
(74) *Attorney, Agent, or Firm*—Oblon, Spivak, McClelland, Maier & Neustadt, P.C.

(57) ABSTRACT

An aqueous paint composition comprising:
  (i) an aqueous dispersion obtained by neutralizing with a neutralizing agent a hydrolytic condensation reaction product of (a) 100 parts by weight of an organosilane of the formula (1) $R^1{}_n Si(OR^2)_{4-n}$, wherein $R^1$ is a $C_{1-8}$ organic group, $R^2$ is a $C_{1-5}$ alkyl group, and n is 1 or 2, and/or its partially hydrolyzed condensate, with (b) from 5 to 200 parts by weight of a silyl group-containing vinyl resin having hydrolyzable silyl groups or silyl groups having silicon atoms bonded to hydroxyl groups and having an acid value of from 20 to 150 mgKOH/g, and adding water thereto,
  (ii) an amino group-containing alkoxysilane compound, and
  (iii) an epoxy group-containing compound.

20 Claims, No Drawings

6,541,562 B1

AQUEOUS PAINT COMPOSITION

BACKGROUND OF THE INVENTION

1. Field of the Invention

The present invention relates to an aqueous paint composition which comprises an aqueous dispersion of a certain organic/inorganic composite resin and its curing agent and which is capable of forming a coating film excellent in hot water resistance, weather resistance, stain resistance, solvent resistance, alkali resistance, etc.

2. Discussion of the Background

A coating film formed by using, as a binder, an organic/inorganic composite resin obtained by subjecting an organosilane and/or its partially hydrolyzed condensate and a silyl group-containing vinyl resin to a hydrolytic condensation reaction, is excellent in weather resistance, stain resistance, etc. and is scarcely susceptible to cracking, like a coating film formed by using an organopolysiloxane type inorganic resin as a binder. Accordingly, an attention has been drawn to a coating composition containing such an organic/inorganic composite resin as a binder.

However, many of such coating compositions are organic solvent type paints, which are not preferable from the viewpoint of air pollution or conservation of resources, and further, there has been a problem that the obtained coating films are poor in e.g. hot water resistance or alkali resistance.

Further, aqueous paints employing organic/inorganic composite resins as binders, are disclosed in JP-B-7-116361, JP-A-11-293131 and JP-A-2000-44807.

JP-B-7-116361 discloses a method wherein a radical polymerizable silane coupling agent and a silane monomer are subjected to a hydrolytic copolymerization reaction, then to radical copolymerization with e.g. a hydrophilic group-containing vinyl monomer, and the obtained resin is neutralized and phase-transferred to water. However, gelation is likely to take place at the time of the radical copolymerization reaction, and there has been a problem that the obtained coating film is poor in e.g. weather resistance or hot water resistance.

JP-A-11-293131 discloses a method wherein a radical polymerizable silane coupling agent, a hydrophilic group-containing vinyl monomer, a radical polymerizable dimethyl polysiloxane, etc., are subjected to radical copolymerization, and the obtained resin is phase-transferred to water. However, there has been a problem that the coating film thereby obtainable is poor in stain resistance or weather resistance.

JP-A-2000-44807 discloses a polysiloxane-containing water-soluble resin obtained by reacting a water-soluble resin having siloxane bonds with a tetra functional alkoxysilane, but there has been a problem that the coating film thereby obtainable is susceptible to cracking and poor in hot water resistance or weather resistance.

SUMMARY OF THE INVENTION

The present invention has been made in view of such problems of the prior art, and it is an object of the present invention to provide an aqueous paint composition capable of forming a coating film excellent in hot water resistance, alkali resistance, weather resistance, stain resistance, etc., by employing an aqueous dispersion of a certain organic/inorganic composite resin and compounds having a specific functional group.

Namely, the present invention provides an aqueous paint composition comprising:

(i) an aqueous dispersion obtained by neutralizing with a neutralizing agent a hydrolytic condensation reaction product of (a) 100 parts by weight of an organosilane of the formula (1) $R^1{}_n Si(OR^2)_{4-n}$, wherein $R^1$ is a $C_{1-8}$ organic group, $R^2$ is a $C_{1-5}$ alkyl group, and n is 1 or 2, and/or its partially hydrolyzed condensate, with (b) from 5 to 200 parts by weight of a silyl group-containing vinyl resin having hydrolyzable silyl groups or silyl groups having silicon atoms bonded to hydroxyl groups and having an acid value of from 20 to 150 mgKOH/g, and adding water thereto, (ii) an amino group-containing alkoxysilane compound, and (iii) an epoxy group-containing compound.

DESCRIPTION OF THE PREFERRED EMBODIMENTS

Now, the present invention will be described in detail with reference to the preferred embodiments.

The respective constituting components of the aqueous paint composition of the present invention will be described.

With Respect to Component (i)

Firstly, the respective components used for the preparation of component (i) which is an aqueous dispersion of an organic/inorganic composite resin, will be described.

Component (a)

Component (a) is an organosilane of the formula (1) $R^1{}_n Si(OR^2)_{4-n}$, wherein $R^1$ is a $C_{1-8}$ organic group, $R^2$ is a $C_{1-5}$ alkyl group, and n is 1 or 2, and/or its partially hydrolyzed condensate.

The organic group as $R^1$ in the above formula may, for example, be an alkyl group, a cycloalkyl group, an aryl group or a vinyl group.

Here, the alkyl group may be linear or branched. The alkyl group may, for example, be a methyl group, an ethyl group, a n-propyl group, an i-propyl group, a n-butyl group, an i-butyl group, a s-butyl group, a t-butyl group, a pentyl group, a hexyl group, a heptyl group or an octyl group. A preferred alkyl group is one having from 1 to 4 carbon atoms.

The cycloalkyl group may, for example, be preferably a cyclohexyl group, a cycloheptyl group or a cyclooctyl group.

The aryl group may, for example, be a phenyl group.

The above respective functional groups may have optional substituents. Such substituents may, for example, be a halogen atom (such as a chlorine atom, a bromine atom or a fluorine atom), a (meth)acryloyl group, a mercapto group, and an alicyclic group.

The alkyl group as $R^2$ may be linear or branched.

The alkyl group may, for example, be a methyl group, an ethyl group, n-propyl group, an i-propyl group, a n-butyl group, an i-butyl group, a s-butyl group, a t-butyl group or a pentyl group. A preferred alkyl group is one having one or two carbon atoms.

Specific examples of the above formula (1) include, for example, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, vinyltrimethoxysilane, vinyltriethoxysilane,
3,3,3-trifluoropropyltrimethoxysilane,
3,3,3-trifluoropropyltriethoxysilane,
cyclohexyltrimethoxysilane,
γ-methacryloxypropyltrimethoxysilane,
γ-methacryloxypropyltriethoxysilane,
γ-mercaptopropyltrimethoxysilane,
γ-mercaptopropyltriethoxysilane, phenyltrimethoxysilane,
phenyltriethoxysilane, dimethyldimethoxysilane,
dimethyldiethoxysilane, diethyldimethoxysilane,
diethyldiethoxysilane, diphenyldimethoxysilane,
diphenyldiethoxysilane, methylphenyldimethoxysilane and
dimethyldipropoxysilane. Preferred is
methyltrimethoxysilane, methyltriethoxysilane or
dimethyldimethoxysilane.

These organosilanes may be used alone or in combination as a mixture of two or more of them.

Component (a) may be a partially hydrolyzed condensate of the above described organosilane. The weight average molecular weight of such a condensate calculated as polystyrene is, for example, from 300 to 5,000, preferably from 500 to 3,000. By using a condensate having such a molecular weight, it is possible to obtain a coating film having a good adhesive property without deteriorating the storage stability. Further, the partially hydrolyzed condensate of the organosilane has at least one, preferably from 3 to 30, —OH groups or —OR$_2$ groups bonded to silicon atoms.

Specific examples of such a condensate include, as commercial products, SH6018, SR2402, DC3037 and DC3074, manufactured by Torey Dow Corning K.K.; KR-211, KR-212, KR-213, KR-214, KR-216 and KR-218, manufactured by Shin-Etsu Chemical Co., Ltd.; and TSR-145, TSR-160, TSR-165 and YR-3187, manufactured by Toshiba-Silicon K.K.

In the present invention, component (a) is preferably a mixture of (a-1) the organosilane of the above formula wherein n is 1 and/or its partially hydrolyzed condensate, and (a-2) the organosilane of the above formula wherein n is 2 and/or its partially hydrolyzed condensate in a weight ratio of from 50:50 to 100:0, preferably from 60:40 to 95:5, since it reacts stably at the time of the hydrolytic condensation reaction, and a coating film having good cracking resistance can be obtained.

Component (b)

Component (b) is a vinyl resin having at least one, preferably at least two, hydrolyzable silyl groups or silyl groups having silicon atoms bonded to hydroxyl groups, per one molecule of the resin, at the terminals or side chains of the vinyl resin and having an acid value of from 20 to 150 mgKOH/g, and the vinyl resin preferably has a molecular weight of e.g. from about 1,000 to 50,000.

The above silyl groups are those represented by the formula (2) —SiX$_p$(R$^3$)$_{(3-p)}$), wherein X is a hydrolyzable group such as an alkoxy group, an acyloxy group, a halogen atom, a ketoximate group, a mercapto group, an alkenyloxy group or a phenoxy group, or a hydroxyl group, R$^3$ is hydrogen or a monovalent hydrocarbon group such as a C$_{1-10}$ alkyl group, an aryl group or an aralkyl group, and p is an integer of from 1 to 3.

The silyl group-containing vinyl resin may, for example, be produced by reacting a hydrosilane compound of the formula (3) (X)$_p$(R$^3$)$_{(3-p)}$Si—H, wherein X, R$^3$ and p are as defined in the above formula (2), with a vinyl resin having a carbon-carbon double bond in accordance with a conventional method.

As a typical example of the hydrosilane compound, methyldichlorohydrosilane, methyldiethoxyhydrosilane or methyldiacetoxyhydrosilane may be mentioned. The hydrosilane compound is used usually in an amount of from 0.5 to 2 mols per mol of the carbon-carbon double bond contained in the vinyl resin.

The vinyl resin contains, as an essential vinyl monomer, a carboxylic acid such as (meth)acrylic acid, itaconic acid or fumaric acid, or an acid anhydride such as maleic anhydride and is preferably a copolymer of such an essential vinyl monomer with a (meth)acrylate such as methyl (meth)acrylate, ethyl (meth)acrylate, butyl (meth)acrylate, ethylhexyl (meth)acrylate or cyclohexyl (meth)acrylate, a hydroxyl group-containing vinyl monomer such as 2-hydroxyethyl (meth)acrylate, 2-hydroxypropyl (meth)acrylate or 2-hydroxyvinyl ether, or other vinyl monomer selected from the group consisting of acrylonitrile, styrene, α-methylstyrene, vinyl acetate and vinyl propionate. It is possible to introduce a carbon-carbon double bond for a hydrosilylation reaction into the vinyl resin by radical copolymerization of allyl (meth)acrylate or diallyl phthalate during the preparation of the copolymer.

It is necessary to incorporate the above carboxylic acid or acid anhydride to the constituting monomers for the copolymer so that the acid value of the resulting vinyl resin will be from 20 to 150 mgKOH/g, preferably from 50 to 120 mgKOH/g. If the acid value is smaller than the above range, the storage stability of the resulting aqueous dispersion tends to be poor, and if it is larger than the above range, the water resistance or hot water resistance of a coating film thereby obtainable tends to be poor, such being undesirable.

As another method for producing the above silyl group-containing vinyl resin, a method may be mentioned wherein a vinyl monomer including the above carboxylic acid or acid anhydride, and a silyl group-containing vinyl compound such as γ-(meth)acryloxypropyltrimethoxysilane,
γ-(meth)acryloxypropyltriethoxysilane,
β-(meth)acryloxyethyltrimethoxysilane,
β-(meth)acryloxyethyltriethoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxypropyldimethylmethoxysilane or
γ-(meth)acryloxypropyldiethylmethoxysilane, are used as essential monomers, and one or more members of the above mentioned other vinyl monomers are radical-polymerized therewith.

As a specific example of such a silyl group-containing vinyl resin, Kanekazemrac manufactured by Kanegafuchi Kagaku Kogyo K.K. may, for example, be mentioned as a commercial product.

Now, the method for preparing the aqueous dispersion of the organic/inorganic composite resin as component (i) of the present invention will be described.

Firstly, a mixture of the above mentioned components (a) and (b) is subjected to hydrolysis and condensation reaction in the presence of e.g. water and a catalyst. The mixing ratio of components (a) and (b) is such that relative to 100 parts by weight of component (a), component (b) is usually from 5 to 200 parts by weight, preferably from 10 to 150 parts by weight. If component (b) is smaller than the above range, the appearance, crack resistance, freezing damage resistance, alkali resistance etc. of a coating film thereby obtainable, tend to be poor, and if it is larger than the above range, the weather resistance, stain resistance, etc. of a coating film thereby obtainable, tend to be poor, such being undesirable.

The amount of water is an amount sufficient for the hydrolysis and condensation reaction of from 45 to 100%, preferably from 50 to 90%, of hydrolyzable groups initially present in the mixture of components (a) and (b), specifically a molar amount corresponding to from 0.4 to 1.0 time, preferably from 0.5 to 0.9 time, of the total number of hydrolyzable groups in the mixture.

The catalyst may, for example, be an inorganic acid such as nitric acid or hydrochloric acid, or an organic acid such as acetic acid, formic acid, or propionic acid. The amount of the catalyst is usually an amount whereby the pH of the mixture will be from 3 to 6.

The hydrolytic condensation reaction is carried out preferably by a method wherein the mixture of components (a) and (b) is reacted with stirring in the presence of water and a catalyst, for example, at a temperature of from 40 to 80° C., preferably from 45 to 65° C., for from 2 to 10 hours, but it is not limited to such a method. The reason for the reaction of at least 45% of hydrolyzable groups initially present in the mixture of components (a) and (b) is that the storage stability of an aqueous dispersion of an organic/inorganic composite resin (emulsion) thereby obtainable is good, and, when used for a coating material, it is possible to form a film having high transparency.

As described above, the hydrolytic condensation reaction of components (a) and (b) can be carried out in one step. However, from the viewpoint of the storage stability of the product, it is preferred to carry out the reaction in the following two steps.

Namely, as a first step, the reaction is carried out with stirring in the presence of water and an acid catalyst at a temperature of from 40 to 80° C., preferably from 45 to 65° C. for from 1 to 8 hours, so that from 40 to 80%, preferably from 45 to 70%, of hydrolyzable groups initially present in the mixture of components (a) and (b), will undergo a hydrolytic condensation reaction.

As a second step following the first step, water and an organic metal compound catalyst such as a trialkoxy borane such as trimethoxyborane or triethoxyborane; a zirconium chelate compound such as zirconium tri-n-butoxyethyl acetoacetate, zirconium di-n-butoxy di(ethylacetoacetate) or zirconium tetrakis(ethyl acetoacetate), a titanium chelate compound such as titanium diisopropoxybis(acetyl acetate) or titanium diisopropoxy bis(ethyl acetoacetate) or an aluminum chelate compound such as aluminum monoacetylacetatebis(ethyl acetoacetate) or aluminum diisopropoxyethyl acetoacetate, are further added, and the hydrolysis and condensation reaction are carried out. The amount of water to be added in the second step is an amount sufficient for the hydrolysis and condensation reaction of from 45 to 100%, preferably from 50 to 90%, of hydrolyzable groups initially present in the mixture of components (a) and (b).

The trialkoxyborane or the organic metal compound catalyst to be used in the second step, is capable of accelerating the condensation reaction and improving the appearance, weather resistance, stain resistance, hot water resistance, etc., of the coating film. The amount of such a catalyst is usually from 0.001 to 5 parts by weight, preferably from 0.005 to 2 parts by weight, per 100 parts by weight of the total amount of the reaction product obtained in the first step and unreacted components (a) and (b). Like the first step, the hydrolytic condensation reaction in the second step is preferably carried out at a temperature of from 40 to 80° C. for from 2 to 5 hours.

The hydrolyzed condensation product is in a solution state due to an alcohol content formed by the reaction or due to such an alcohol content and the after mentioned organic solvent which is added as the case requires.

To the solution of an organic/inorganic composite resin which is a reaction product thus obtained, a neutralizing agent is added and uniformly dispersed for neutralization, followed by an addition of water, or a neutralizing agent and water are simultaneously added and stirred for forcible dispersion to obtain an aqueous dispersion (emulsion). The amount of the neutralizing agent is usually an amount whereby from 50 to 100%, preferably from 60 to 95%, of acid groups in the organic/inorganic composite resin as the reaction product, can be neutralized, so that a stable emulsion can be obtained. As the neutralizing agent, triethylamine, triethanolamine, dimethylethanolamine, monoethanolamine, N-methyldiethanolamine, N,N-dimethylethanolamine or morpholine, may be mentioned as a typical example. Further, the amount of water is optionally determined taking into consideration e.g. the coating operation efficiency of the coating material, but it is usually an amount whereby the solid content of the coating composition will be from 10 to 70 wt %.

In the aqueous dispersion of the organic/inorganic composite resin thus obtained, an alcohol content will be formed by the above described hydrolytic condensation reaction, and it remains in the aqueous dispersion. Accordingly, if the aqueous dispersion is used directly as a coating composition, a volatile organic component (VOC) will be large, and therefore, the alcohol content may be removed under reduced pressure in accordance with a conventional method.

With Respect to Component (ii)

Component (ii) is a hydrolytic condensation reactive alkoxysilane having an amino group in its molecule. Specifically, it is preferably an amino group-containing alkoxysilane represented by the formula (4) ($R^6$—NH—$R^5$—)$^n$($R^7$)$_m$Si(OR$^4$)$_{4-m-n}$, wherein each of $R^4$ and $R^7$ is a. $C_{1-5}$ alkyl group, $R^5$ is a $C_{1-5}$ alkylene group, $R^6$ is a hydrogen atom, a $C_{1-5}$ alkyl group, a $C_{5-8}$ cycloalkyl group, a $C_{6-8}$ aryl group, or a substituted or unsubstituted amino group, n is 1 or 2, and m is 1 or 0.

$R^4$ and $R^7$ may be linear or branched. As the alkyl group; for $R^4$ and $R^7$, an alkyl group such as a methyl group, an ethyl group, a n-propyl group, an i-propyl group, a n-butyl group, an i-butyl group, a s-butyl group, a t-butyl group or a pentyl group. A preferred alkyl group is one having an carbon number of e.g. 1 or 2.

The alkylene group for $R^5$ may be linear or branched.

As such an alkylene group, a methylene group, an ethylene group₁or a propylene may, for example, be mentioned.

The $C_{1-5}$ alkyl group for $R^6$ is the same as in the case of the above mentioned $R^4$. As the cycloalkyl group for $R^6$, a cyclohexyl group or a cycloheptyl group may, for example, be mentioned. As the aryl group for $R^6$, a phenyl group may, for example, be mentioned. Further, as the amino group for $R^6$, one having one or both of hydrogen atoms in an amino group substituted by e.g. the above mentioned $C_{1-5}$ alkyl group, may be mentioned as preferred.

The amino group-containing alkoxysilane represented by the above formula, may, for example, be
γ-aminopropyltrimethoxysilane,
γ-aminopropyltriethoxysilane,
N-(β-aminoethyl)-γ-aminopropyltrimethoxysilane,
N-(β-aminoethyl)-γ-aminopropylmethyldimethoxysilane,
N-(β-aminoethyl)-γ-aminopropylmethyldiethoxysilane,
N-cyclohexyl-γ-aminopropyltrimethoxysilane,
N-cyclohexyl-γ-aminopropyltriethoxysilane,
γ-(2-aminoethyl)-aminopropyltrimethoxysilane,
γ-(2-aminoethyl)-aminopropylmethyldimethoxysilane or
γ-anilinopropyltrimethoxysilane.

The amount of component (ii) is usually from 0.5 to 30 parts by weight, preferably from 2 to 15 parts by weight, per 100 parts by weight of the solid content (the organic/inorganic composite resin) in the aqueous dispersion as the above mentioned component (i).

If component (ii) is smaller than the above range, the curing property or stain resistance of the resulting coating film tends to be poor, and if it exceeds the above range, the hot water resistance or cracking resistance tends to be poor.

With Respect to Component (iii)

Component (iii) is a compound having, in its molecule, an epoxy group which is reactive with the amino group in the above-described component (ii). As such a compound, an epoxy group-containing alkoxysilane, an alkylglycidyl ether or ester, a cycloepoxy compound, bisphenol A, a F type low molecular weight epoxy resin, or an emulsified product thereof, may, for example, be employed.

Specifically, γ-glycidoxypropyltrimethoxysilane, γ-glycidoxypropyltriethoxysilane, γ-glycidoxypropylmethyldimethoxysilane, γ-glycidoxypropylmethyldiethoxysilane, γ-glycidoxypropyltriisopropenyloxysilane, γ-glycidoxypropyltriiminooxysilane, β-(3,4-epoxycyclohexyl)ethylmethyldimethoxysilane, an adduct of γ-isocyanatepropyltriisopropenyloxysilane with glycidol, butyl glycidyl ether, polyoxyethylene glycidyl ether, KadulerE (tradename, manufactured by Shell Company), butylphenyl glycidyl ether, Epicort 815, 828 or 834 (,tradename, manufactured by Yuka Shell Epoxy K.K.), and emulsified products thereof, may be mentioned as typical examples.

Among the above mentioned epoxy group-containing compounds, an epoxy group-containing alkoxysilane compound having a hydrolysable silyl group is preferred, since the curing property of the coating film will thereby be improved, and the hot water resistance, alkali resistance, etc. will thereby be good.

The amount of component (iii) is usually such that the epoxy equivalent of the epoxy group-containing compound is from 0.1 to 2.0 equivalents, preferably from 0.2 to 1.2 equivalents, per equivalent of active hydrogen of the amino group in the amino group-containing alkoxysilane compound as the above-described component (ii).

If the amount of the epoxy group-containing compound is smaller than the above range, the hot water resistance, etc. of the obtainable coating film tend to be poor, and, on the other hand, if it exceeds the above range, the weather resistance, cracking resistance, etc. of the coating film tend to be poor.

From the viewpoint of the storage stability, it is preferred that one or both of the amino group-containing alkoxysilane compound as component (ii) and the epoxy group containing compound as component (iii), are mixed and dispersed in the aqueous dispersion of component (i) immediately prior to coating.

The amino group in component (ii) will react with the epoxy group in component (iii), and at the same time, the silyl group in component (ii), and further, the silyl group in component (iii) will undergo a hydrolytic condensation reaction with silyl groups remaining in the organic/inorganic composite resin in component (i), thereby to form a cured coating film excellent in the hot water resistance, alkali resistance, weather resistance, stain resistance, solvent resistance, etc.

The paint composition of the present invention comprises the aqueous dispersion of component (i), the amino group-containing alkoxysilane compound of component (ii) and the epoxy group group-containing compound of component (iii), as described in the foregoing, as the main components, and, if necessary, further contains water, an organic solvent and a filler to improve the storage stability or coating operation efficiency of the paint composition, as well as various additives such as a dye, a curing accelerator, a thickner, a pigment dispersant, etc.

The above organic solvent may, for example, be a hydrophilic organic solvent such as an alcohol such as methanol, ethanol, propanol or butanol, an alcohol ether, such as ethylene glycol monoethyl ether or ethylene glycol monobutyl ether, or a ketone such as acetone or methyl ethyl ketone, or an organic solvent mixture thereof with a hydrophobic various coating organic solvent such as toluene, xylene, ethyl acetate or butyl acetate. Such an organic solvent may be incorporated as a solvent during the preparation of the above described aqueous dispersion (i), so that the reaction takes place uniformly. The amount of the organic solvent is usually from 0 to 20 wt %, preferably from 0 to 10 wt %, in the paint composition.

As the above filler, various extenders or coloring pigments for paints, such as talc, barium carbonate, calcium carbonate, barium carbonate, bentonite, titanium oxide, carbon black, iron red and lithopone, may be used. The amount of the filler is usually from 0 to 70 wt %, preferably from 0 to 50 wt %, based on the solid content of the paint composition.

As the above curing accelerator, an organic tin compound such as tin octylate, dibutyltin dilaurate, dibutyltin dimalate or tributyltin laurate, or an amine compound such as ethylene diamine, diethylene triamine, piperidine, phenylene diamine or triethyl amine, may be mentioned as a typical example. Particularly effective is an organic tin compound.

The paint composition of the present invention may be coated on the surface of an object to be coated, by a coating means such as brush, spray, roll or dip-coating, followed by baking at room temperature or a temperature of not higher than 300° C., to form a cured coating film. As the object to be coated, it is possible to employ an inorganic porcelain substrate, a substrate of various metals such as stainless steel or aluminum, or various objects to be coated, such as a glass substrate, a plastic substrate or a paper substrate.

EXAMPLES

Now, the present invention will be described in further detail with reference to Examples. In the Examples, "parts" and "%" mean "parts by weight" and "%. by weight" unless otherwise specified.

Reference Example 1

Preparation of Silyl Group-containing Vinyl Resin Solution (b-1)

Into a reactor equipped with a reflux condenser and a stirrer, 100 parts of ethylene glycol monobutyl ether was added and heated to 100° C. with stirring. Then, a mixed solution containing 50 parts of isobutyl methacrylate, 31.5 parts of 2-ethylhexyl methacrylate, 10 parts of γ-methacryloxypropyltrimethoxysilane, 8.5 parts of acrylic acid and 2.5 parts of t-butylperoxy-2-ethyl hexanoate, was dropwise added over a period of 3 hours at 100° C. Then, the temperature was raised to 105° C. and maintained at that temperature for two hours to complete the reaction. The obtained silyl group-containing vinyl resin solution (b-1) had a solid content concentration of 50%, an acid value of the resin of 65 mgKOH/g and a number average molecular weight of 10,000.

Reference Example 2

Preparation of Silyl Group-containing Vinyl Resin Solution (b-2)

Into a reactor equipped with a reflux condenser and a stirrer, 100 parts of ethylene glycol monobutyl ether was added and heated to 100° C. with stirring. Then, a mixed solution containing 50 parts of isobutyl methacrylate, 31.5 parts of 2-ethylhexyl methacrylate, 8.5 parts of γ-methacryloxypropyltrimethoxysilane, 10.5 parts, of acrylic acid and 2.5 parts of t-butylperoxy-2-ethyl hexanoate, was dropwise added over a period of 3 hours at 100° C. Then, the temperature was raised to 105° C. and maintained at that temperature for two hours to complete the reaction. The obtained silyl group-containing vinyl resin solution (b-2) had a solid content concentration of 50%, an acid value of the resin of 80 mgKOH/g and a number average molecular weight of 10,0:0.

Preparation of Organic/inorganic Composite Resin Aqueous Dispersion A

Into a reactor equipped with a reflux condenser and a stirrer, 23 parts of (a) a partially hydrolyzed condensation product of methyltrimethoxysilane (SR2402, manufactured by Torey Dow Corning K.K.; solid content: 100%), 8 parts of methyltrimethoxysilane, 1.7 parts of dimethyldimethoxysilane, 25 parts of (b) the silyl group-containing vinyl resin solution (b-1) and 10 parts of isopropanol, were added and mixed. Then, 3.0 parts of deionized water and 0.05 part of 1 N hydrochloric acid were added, followed by a reaction at 60° C. for 3 hours. Then, 0.3 part of aluminum monoacetylacetonate bis (ethylacetoacetate) and 0.8 part of deionized water were added, followed by a further reaction at 60° C. for 3 hours. Then, 0.6 part of triethylamine and 37 parts of water were added thereto, followed by stirring at 50° C. for one hour. Then, under reduced pressure ($1.3 \times 10^4$ Pa (100 torr)), the solvent was removed, and then dilution and adjustment were carried out with water so that the solid content concentration would be 35%, to obtain aqueous dispersion A of organic/inorganic composite resin.

Preparation of Organic/inorganic Composite Resin Aqueous Dispersion B

Into a reactor equipped with a reflux condenser and a stirrer, 25 parts of (a) a partially hydrolyzed condensation product of phenyltrimethoxysilane (DC3074, manufactured by Torey Dow Corning K.K.; solid content: 100%) 8 parts of methyltrimethoxysilane, 25 parts of (b) the silyl group-containing vinyl resin solution (b-1) and 10 parts of isopropanol, were added and mixed. Then, 2.0 parts of deionized water and 0.05 part of 1 N hydrochloric acid were added, followed by a reaction at 60° C. for 3 hours. Then, 0.5 part of triethoxyborane and 0.5 part of deionized water were added, followed by a further reaction at 60° C. for 3 hours. Then, 0.8 part of N,N-dimethylethanolamine and 40 parts of water were added, followed by stirring at 50° C. for one hour. Under reduced pressure ($1.3 \times 10^4$ Pa (100 torr)), the solvent was removed, and then dilution and adjustment were carried out with water so that the solid content concentration would be 35%, to obtain aqueous dispersion B of organic/inorganic composite resin.

Preparation of Organic/inorganic Composite Resin Aqueous Dispersion C

Into a reactor equipped with a reflux condenser and a stirrer, 30 parts of (a) methyltrimethoxysilane, 10 parts of dimethyldimethoxysilane, 16 parts of (b) the silyl group-containing vinyl resin solution (b-2) and 5 parts of isopropanol, were added and mixed. Then, 5.2 parts of deionized water and 0.05 part of 1 N hydrochloric acid were added, followed by a reaction at 60° C. for 3 hours. Then, 0.3 part of aluminum monoacetylacetonate bis (ethylacetoacetate) and 1.5 parts of deionized water were added, followed by a further reaction at 600° C. for 3 hours. Then, 5 part of ethylene glycol monobutyl ether, 0.8 part of N,N-dimethylethanolamine and 50 parts of water were added,c followed by stirring at 50° C. for one hour. Under reduced pressure ($1.3 \times 10^4$ Pa (100 torr)), the solvent was removed, and then dilution and adjustment were carried out with water so that the solid content concentration would be 35%, to obtain aqueous dispersion C of organic/inorganic composite resin.

Examples 1 to 6 and Comparative Examples 1 to 4

One of the above mentioned aqueous dispersions of organic/inorganic composite resins, an amino group-containing alkoxysilane compound and an epoxy group-containing compound were mixed immediately before coating in the proportions shown in Table 1 or 2 to obtain a paint composition.

Using the obtained paint composition, a coated plate was prepared as described hereinafter, and tests on various coating film properties such as the appearance, hardness, hot water resistance, stain resistance, weather resistance and alkali resistance of the coating film, were carried out. The results are shown in a lower portion of Table 1 or 2.

Tests on Coating Film Properties

As a base material, a gypsum slag perlite plate (thickness: 12 mm) was used, and on its surface, a sealer of a polyisocyanate prepolymer solution "V Ceran #100 Sealer" (tradename, manufactured by Dainippon Toryo Co., Ltd.), (diluted to 100% with a solution of butyl acetate:xylene= 1:1) was spray-coated so that the coated amount would be from 90 to 100 g/m² (wet amount by weight). The coated plate was dried at 100° C. for 5 minutes. Then, as a base coating material, an acryl silicon resin type coating material "V Ceran #500 Enamel" (tradename, manufactured by Dainippon Toryo Co., Ltd.): (diluted to 40% with a solution of butyl acetate:xylene=1:1) was spray-coated so that the coated amount would be from 80 to 90 g/m² (wet amount by weight). The coated plate was dried at 120° C. for 15 minutes. Then, the paint composition having a composition as identified in Table 1 or 2 was spray-coated so that the coated amount would be 130±10 g/m² (wet amount by weight). The coated plate was dried at 80° C. for 12 minutes and then further dried at room temperature for three days to obtain a coated plate.

The test methods and evaluations were carried out as follows.

Appearance: The appearance of the coating film formed on the coated plate was visually evaluated.

Hardness: Pencil hardness measured in accordance with JIS K 5400.

Hot water resistance: The coated plate was immersed in water of 80° C., and any abnormality of the appearance of the coating film was visually observed and evaluated in accordance with the following evaluation standards.

○: No change observed

Δ: Slight change such as deterioration in gloss or whitening observed.

X: Substantial change such as deterioration in gloss or whitening observed.

Stain resistance: Red and black marker inks were coated, and 24 hours later, they were wiped off with a cloth wetted with n-butanol, whereupon the stain removal property was visually evaluated in accordance with the following evaluation standards.

⊚: Completely removed

○: Very slight stain

Δ: Slight stain

X: Substantial stain

Whether resistance: 3,000 Hours by sunshine weather-o-meter

○: No change observed in the coating film appearance, and the gloss-maintaining rate being at least 95%.

Δ: Slight change observed in the coating film appearance, and the gloss-maintaining rate being from 80 to 94%.

X: Substantial change was observed in the coating film appearance, and the gloss-maintaining rate being less than 80%.

Alkali resistance: Each coated plate was immersed in a saturated slaked lime alkaline aqueous solution at 40° C. for ten days, whereupon the coating film surface was visually evaluated in accordance with the following evaluation standards.

○: No change observed

Δ: Slight turbidity of the film surface observed.

X: Substantial turbidity of the film surface observed.

TABLE 2

|  | Comparative Example | | | |
|---|---|---|---|---|
|  | 1 | 2 | 3 | 4 |
| Aqueous dispersion A (solid content: 35%) | 100 | 100 | | |
| Aqueous dispersion B (solid content: 35%) | | | 100 | |
| Aqueous dispersion C (solid content: 35%) | | | | 100 |
| N-(β-aminoethyl)-γ-aminopropyltrimethoxysilane | | | 3 | |
| N-(β-aminoethyl)-γ-aminopropylmethyldiethoxysilane | | | | 3 |
| YED205 (*1) | 3 | | | |
| γ-Glycidoxypropyltrimethoxysilane | | 2.5 | | |
| γ-Glycidoxypropylmethyldiethoxysilane | | | | |
| Appearance | Turbid | Good | Good | Good |
| Pencil hardness | B | B | H | H |
| Stain resistance | X | Δ | ○ | ○ |
| How water resistance (80° C. for 1 hr) | Δ | Δ | Δ | Δ |
| How water resistance (80° C. for 6 hr) | X | X | X | X |
| Weather resistance | X | Δ | Δ | Δ |
| Alkali resistance | Δ | Δ | X | X |

*1: polyglycol diglycidyl ether (tradename, manufactured by Yuka Shell Epoxy K.K.)

As is evident from Table 1, the paint compositions of the present invention in Examples 1 to 6 had excellent coating film properties. On the other hand, with the paint compositions containing only one of the amino group-containing alkoxy silane compound and the epoxy group-containing compound in Comparative Examples 1 to 4, the hot water resistance, weather resistance, alkali resistance, etc. were inferior.

As described in the foregoing, the paint composition of the present invention is capable of forming a coating film excellent in the hot water resistance, weather resistance, stain resistance, solvent resistance, alkali resistance, etc.

TABLE 1

|  | Example | | | | | |
|---|---|---|---|---|---|---|
|  | 1 | 2 | 3 | 4 | 5 | 6 |
| Aqueous dispersion A (solid content: 35%) | 100 | | | 100 | | |
| Aqueous dispersion B (solid content: 35%) | | 100 | | | 100 | |
| Aqueous dispersion C (solid content: 35%) | | | 100 | | | 100 |
| N-(β-aminoethyl)-γ-aminopropyltrimethoxysilane | 1 | 1 | 1 | | | |
| N-(β-aminoethyl)-γ-aminopropylmethyldimethoxysilane | | | | 3 | 3 | 3 |
| YED205 (*1) | | 2 | | | | 6 |
| γ-Glycidoxypropyltrimethoxysilane | 2.5 | | 2.5 | | | |
| γ-Glycidoxypropylmethyldiethoxysilane | | | | 8 | 8 | |
| Appearance | Good | Good | Good | Good | Good | Good |
| Pencil hardness | 3 H | 2 H | 2 H | 3 H | 2 H | 2 H |
| Stain resistance | ⊚ | ○ | ⊚ | ⊚ | ⊚ | ○ |
| How water resistance (80° C. for 1 hr) | ○ | ○ | ○ | ○ | ○ | ○ |
| How water resistance (80° C. for 6 hr) | ○ | ○ | ○ | ○ | ○ | ○ |
| Weather resistance | ○ | ○ | ○ | ○ | ○ | ○ |
| Alkali resistance | ○ | ○ | ○ | ○ | ○ | ○ |

*1: polyglycol diglycidyl ether (tradename, manufactured by Yuka Shell Epoxy K.K.)

Further, the epoxy equivalent of an epoxy group-containing compound per equivalent of active hydrogen of the amino group in an amino group-containing alkoxysilane compound was 0.78 equivalent in Examples 1 and 3, 0.99 equivalent in Example 2, 0.74 equivalent in Examples 4 and 5 and 0.58 equivalent in Example 6.

The entire disclosure of Japanese Patent Application No. 2;000-19868 filed on Jan. 28, 1996 including specification, claims and summary are incorporated herein by reference in its entirety.

What is claimed is:

1. An aqueous paint composition comprising:

(i) an aqueous dispersion obtained by neutralizing with a neutralizing agent a hydrolytic condensation reaction product of (a) 100 parts by weight of an organosilane of the formula (1) $R^1{}_n Si(OR^2)_{4-n}$, wherein $R^1$ is a $C_{1-8}$ alkyl, cycloalkyl, aryl or vinyl group, $R^2$ is a $C_{1-5}$ alkyl group, and n is 1 or 2, and/or its partially hydrolyzed condensate, with (b) from 5 to 1200 parts by weight of a silyl group-containing vinyl resin having hydrolyzable silyl groups or silyl groups having silicon atoms bonded to hydroxyl groups and having an acid value of from 20 to 150 mgKOH/g, and adding water thereto, (ii) an amino group-containing alkoxysilane compound, and (iii) an epoxy group-containing compound.

2. The aqueous paint composition according to claim 1, wherein the hydrolytic condensation reaction product in the aqueous dispersion (i) is one obtained by carrying out a first stage of the reaction so that from 40 to 80% of hydrolyzable groups initially present in a mixture of the components (a) and (b) are reacted in the presence of water and an acid catalyst, and then carrying out a second stage of the reaction so that from 45 to 100% of hydrolyzable groups initially present in the mixture are reacted in the presence of water and a trialkoxyborane or an organic metal compound catalyst.

3. The aqueous paint composition according to claim 1, wherein the epoxy group-containing compound (iii) is an epoxy group-containing alkoxysilane compound.

4. The aqueous paint composition according to claim 1, which contains the amino group-containing alkoxysilane compound (ii) in an amount of from 0.5 to 30 parts by weight per 100 parts by weight of the solid content of the aqueous dispersion (i) and which contains the epoxy group-containing compound (iii) in a proportion such that the epoxy equivalent of the epoxy group-containing compound is from 0.1 to 2.0 equivalents per equivalent of active hydrogen of the amino group in the amino group-containing alkoxysilane compound (ii).

5. The aqueous paint composition according to claim 1, wherein one or both of the amino group-containing alkoxysilane (ii) and the epoxy group-containing compound (iii) are mixed to the aqueous dispersion (i) immediately before coating.

6. The aqueous paint composition according to claim 1, wherein $R^1$ is an alkyl group, which may be linear or branched.

7. The aqueous paint composition according to claim 1, wherein $R^1$ is an alkyl group selected from the group consisting of methyl, ethyl, n-propyl, i-propyl, n-butyl, i-butyl, s-butyl, t-butyl, pentyl, hexyl, heptyl and octyl group.

8. The aqueous paint composition according to claim 1, wherein $R^1$ is a $C_{1-4}$ alkyl group.

9. The aqueous paint composition according to claim 1, wherein $R^1$ is a cycloalkyl group.

10. The aqueous paint composition according to claim 1, wherein $R^1$ is a cycloalkyl group selected from the group consisting of cyclohexyl, cycloheptyl and cyclooctyl group.

11. The aqueous paint composition according to claim 1, wherein $R^1$ is an aryl group.

12. The aqueous paint composition according to claim 1, wherein $R^1$ is a phenyl group.

13. The aqueous paint composition according to claim 1, wherein $R^1$ is substituted with a substituent selected from the group consisting of halogen, (meth)acryloyl, mercapto and alicyclic substituent.

14. The aqueous paint composition according to claim 1, wherein $R^2$ is an alkyl group, which may be linear or branched.

15. The aqueous paint composition according to claim 1, wherein $R^2$ is an alkyl group selected from the group consisting of methyl, ethyl, n-propyl, i-propyl, n-butyl, i-butyl, s-butyl, t-butyl and pentyl group.

16. The aqueous paint composition according to claim 1, wherein $R^2$ is a $C_{1-2}$ alkyl group.

17. The aqueous paint composition according to claim 1, wherein (a) is an organosilane selected from the group consisting of methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, vinyltrimethoxysilane, vinyltriethoxysilane, 3,3,3-trifluoropropyltrimethoxysilane, 3,3,3-trifluoropropyltriethoxysilane, cyclohexyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane, phenyltrimethoxysilane, phenyltriethoxysilane, dimethyldimethoxysilane, dimethyldiethoxysilane, diethyldimethoxysilane, diethyldiethoxysilane, diphenyldimethoxysilane, diphenyldiethoxysilane, methylphenyldimethoxysilane, dimethyldipropoxysilane, and mixtures thereof.

18. The aqueous paint composition according to claim 1, wherein (a) is an organosilane selected from the group consisting of methyltrimethoxysilane, methyltriethoxysilane, and dimethyldimethoxysilane.

19. The aqueous paint composition according to claim 1, wherein (a) is a partially hydrolyzed condensate of at least one organosilane selected from the group consisting of methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, vinyltrimethoxysilane, vinyltriethoxysilane, 3,3,3-trifluoropropyltrimethoxysilane, 3,3,3-trifluoropropyltriethoxysilane, cyclohexyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane, phenyltrimethoxysilane, phenyltriethoxysilane, dimethyldimethoxysilane, dimethyldiethoxysilane, diethyldimethoxysilane, diethyldiethoxysilane, diphenyldimethoxysilane, diphenyldiethoxysilane, methylphenyldimethoxysilane, dimethyldipropoxysilane, and mixtures thereof.

20. The aqueous paint composition according to claim 1, wherein (a) is a partially hydrolyzed condensate having a weight average molecular weight calculated as polystyrene ranging from 300 to 5,000.

* * * * *